(12) United States Patent
You et al.

(10) Patent No.: US 10,701,433 B2
(45) Date of Patent: Jun. 30, 2020

(54) RENDERING OF USER-DEFINED MESSAGE HAVING 3D MOTION INFORMATION

(71) Applicant: Nokia Technologies Oy, Espoo (FI)

(72) Inventors: Yu You, Kangasala (FI); Lixin Fan, Tampere (FI); Tinghuai Wang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/312,530

(22) PCT Filed: Jun. 13, 2017

(86) PCT No.: PCT/FI2017/050438
§ 371 (c)(1),
(2) Date: Dec. 21, 2018

(87) PCT Pub. No.: WO2018/002420
PCT Pub. Date: Jan. 4, 2018

(65) Prior Publication Data
US 2019/0215557 A1    Jul. 11, 2019

(30) Foreign Application Priority Data

Jun. 29, 2016 (EP) .................................... 16177008

(51) Int. Cl.
*H04N 7/10* (2006.01)
*H04N 21/431* (2011.01)
(Continued)

(52) U.S. Cl.
CPC ....... *H04N 21/4312* (2013.01); *G06K 9/3233* (2013.01); *G06T 15/005* (2013.01);
(Continued)

(58) Field of Classification Search
CPC ........... H04N 21/4312; H04N 21/4788; H04N 21/4882; H04N 21/8146; H04N 21/816; G06K 9/3233; G06T 15/005
See application file for complete search history.

(56) References Cited

U.S. PATENT DOCUMENTS 6,784,901 B1    8/2004   Harvey et al.
9,189,818 B2   11/2015   McClements, IV
(Continued)

FOREIGN PATENT DOCUMENTS

CN    104618813 A    5/2015
CN    105068795 A   11/2015
(Continued)

OTHER PUBLICATIONS

Office action received for corresponding European Patent Application No. 16177008.6, dated Mar. 15, 2019, 6 pages.
(Continued)

*Primary Examiner* — Mulugeta Mengesha
(74) *Attorney, Agent, or Firm* — Nokia Technologies Oy

(57) ABSTRACT

A method comprising: enabling a first user to define a message for display to at least a second user in association with a first three-dimensional scene viewed by the first user and viewed by or viewable by the second user, wherein the message comprises user-defined message content for display and message metadata, not for display, defining first three-dimensional spatial information; and enabling rendering of the user-defined message content in a second three-dimensional scene viewed by the second user, wherein the user-defined message content moves, within the second three-dimensional scene, along a three-dimensional trajectory dependent upon the first three-dimensional spatial information and three-dimensional spatial information of the second user.

20 Claims, 3 Drawing Sheets

(51) Int. Cl.
*H04N 21/81* (2011.01)
*H04N 21/488* (2011.01)
*H04N 21/4788* (2011.01)
*G06K 9/32* (2006.01)
*G06T 15/00* (2011.01)
*G06F 40/109* (2020.01)

(52) U.S. Cl.
CPC ..... *H04N 21/4788* (2013.01); *H04N 21/4882* (2013.01); *H04N 21/816* (2013.01); *H04N 21/8146* (2013.01); *G06F 40/109* (2020.01)

(56) References Cited

U.S. PATENT DOCUMENTS

| | | | |
|---|---|---|---|
| 2005/0159939 A1* | 7/2005 | Mohler | G06F 40/109 704/4 |
| 2009/0112906 A1* | 4/2009 | Shuster | A63F 13/12 |
| 2009/0237328 A1 | 9/2009 | Gyorfi et al. | |
| 2011/0035684 A1* | 2/2011 | Lewis | A63F 13/10 715/753 |
| 2011/0161856 A1 | 6/2011 | Nurmi et al. | |
| 2012/0140025 A1* | 6/2012 | Friedman | H04N 21/4307 348/42 |
| 2015/0178257 A1 | 6/2015 | Jones et al. | |
| 2016/0093108 A1 | 3/2016 | Mao et al. | |

FOREIGN PATENT DOCUMENTS

| | | |
|---|---|---|
| CN | 105100927 A | 11/2015 |
| CN | 205038432 U | 2/2016 |
| KR | 2015-0054412 A | 5/2015 |
| WO | 2016/029224 A1 | 2/2016 |

OTHER PUBLICATIONS

"Theaters in China Screen Movies, and Viewers' Text Messages", Sinosphere, The New York Times, Retrieved on Dec. 12, 2018, Webpage available at : https://sinosphere.blogs.nytimes.com/2014/08/20/theaters-in-china-screen-movies-and-viewers-text-messages/?_r=1.

Extended European Search Report received for corresponding European Patent Application No. 16177008.6, dated Oct. 6, 2016, 8 pages.

Forlizzi et al., "The Kinedit System: Affective Messages Using Dynamic Texts", Proceedings of the SIGCHI conference on Human factors in computing systems, vol. 5, No. 1, Apr. 5-10, 2003, pp. 377-384.

International Search Report and Written Opinion received for corresponding Patent Cooperation Treaty Application No. PCT/FI2017/050438, dated Aug. 31, 2017, 12 pages.

Summons Oral Proceedings received for corresponding European Patent Application No. 16177008.6, dated Nov. 5, 2019, 5 pages.

* cited by examiner

RENDERING OF USER-DEFINED MESSAGE HAVING 3D MOTION INFORMATION

RELATED APPLICATION

This application was originally filed as Patent Cooperation Treaty Application No. PCT/FI2017/050438 filed Jun. 13, 2017 which claims priority benefit to EP Patent Application No. 16177008.6, filed Jun. 29, 2016.

TECHNOLOGICAL FIELD

Embodiments of the present invention relate to rendering of user-defined messages.

BACKGROUND

It is known in China and Japan to scroll user-defined messages from different users simultaneously across a display screen, from right to left in multiple rows, as a foreground in front of displayed two-dimensional video content. The messages are referred to as barrage messages e.g. "Danmu" or "danmaku".

BRIEF SUMMARY

According to various, but not necessarily all, embodiments of the invention there is provided a method comprising: enabling a first user to define a message for display to at least a second user in association with a first three-dimensional scene viewed by the first user and viewed by or viewable by the second user, wherein the message comprises user-defined message content for display and message metadata, not for display, defining first three-dimensional spatial information; and enabling rendering of the user-defined message content in a second three-dimensional scene viewed by the second user, wherein the user-defined message content moves, within the second three-dimensional scene, along a three-dimensional trajectory dependent upon the first three-dimensional spatial information and three-dimensional spatial information of the second user.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Figure 1:
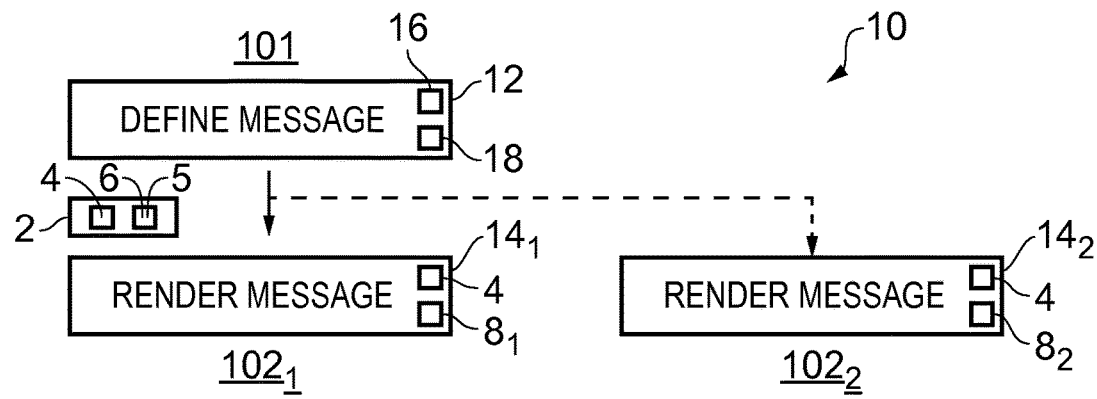
FIG. 1 illustrates an example of a messaging method.

The Figs illustrate an example of a method 10 comprising: enabling a first user 101 (FIG. 4) to define a message 2 (FIG. 1, 7) for display (FIG. 3B, 6A, 6B) to at least a second user 102 (FIG. 5A-C) in association with a first three-dimensional scene 20 (FIG. 3A) viewed by the first user 101 and viewed by or viewable (FIG. 3B) by the second user 102, wherein the message 2 comprises user-defined message content 4 (FIG. 1) for display and message metadata 6 (FIG. 1), not for display, defining first three-dimensional spatial information 5 (FIG. 1); and enabling rendering (FIG. 3B, 6A, 6B) of the user-defined message content 4 in a second three-dimensional scene 20' viewed by the second user 102, wherein the user-defined message content 4 moves, within the second three-dimensional scene 20', along a three-dimensional trajectory 8 dependent upon the first three-dimensional spatial information 5 and three-dimensional spatial information 55 of the second user 102.

FIG. 1 illustrates an example of a messaging method 10.

At block 12, the method 10 comprises enabling a first user 101 to define a message 2 for display to at least a second user 102 in association with a first three-dimensional scene 20 viewed by the first user 101 and viewed by or viewable by the second user 102. The message 2 comprises user-defined message content 4 for display and message metadata 6, not for display, defining first three-dimensional spatial information 5.

At block 14, the method comprises enabling rendering of the user-defined message content 4 in a second three-dimensional scene 20' viewed by the second user 102. The user-defined message content 4 moves, within the second three-dimensional scene 20', along a three-dimensional trajectory 8 dependent upon the first three-dimensional spatial information 5 and three-dimensional spatial information 55 of the second user 102.

In some but not necessarily all examples, the message metadata 6 of the message 2 may be defined automatically, at sub-block 18, in response to user-definition, at sub-block 16, of the user-defined message content 4 of the message 2.

In some, but not necessarily all embodiments the messaging method 10 enables the messaging of multiple users $102_n$ simultaneously or asynchronously. At block 12, the message 2 is defined for display to at least multiple other users $102_n$, including the second user 102, in association with the first three-dimensional scene 20 viewed by the first user 101 and viewed by or viewable by the other users 102.

In some but not necessarily all examples, the first user 101 may be one of the other users 102.

For each of the other users $102_n$, there is a block $14_n$, enabling rendering of the user-defined message content 4 in a three-dimensional scene $20_n'$ viewed by the respective other user $102_n$. The user-defined message content 4 moves, within the three-dimensional scene $20_n'$ viewed by the respective other user $102_n$, along a three-dimensional trajectory $8_n$ dependent upon the first three-dimensional spatial information 5, and three-dimensional spatial information of the respective other user $102_n$. In this way each of the other users $102_n$ views the same user-defined message content 4, within their own personal scene $20_n'$ and moving with their own personal trajectory $8_n$.

Figure 2:
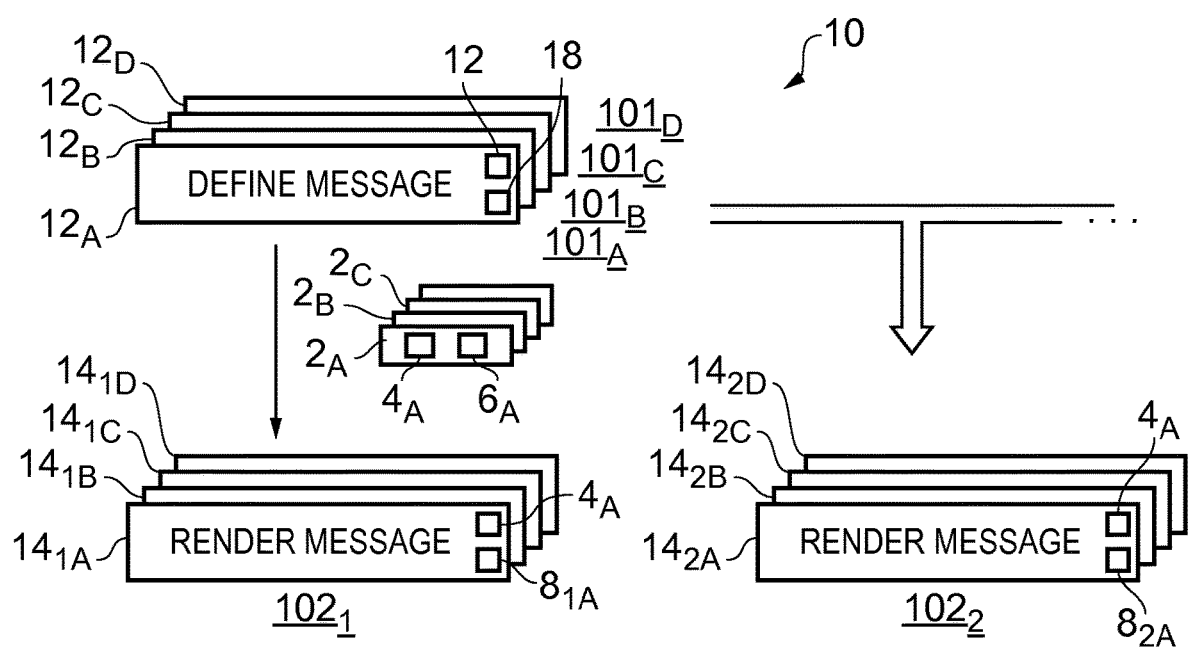
FIG. 2 illustrates another example of a messaging method.

In some, but not necessarily all embodiments, for example as illustrated in FIG. 2, the messaging method 10 additionally enables the messaging, from multiple originating users $101_m$ including the first user 101, simultaneously or asynchronously. For each of the multiple originating users $101_m$, there is a block $12_m$, enabling a respective originating user $101_m$ to define a different message $2_m$ for display to at least multiple other users $102_n$ in association with a first three-dimensional scene $20_m$ viewed by the respective originating user $101_m$ and viewed by or viewable by the other users $102_n$. Each message $2_m$ comprises user-defined message content $4_m$ for display defined by the respective originating user $101_m$ and message metadata $6_m$, not for display, defining first three-dimensional spatial information $5_m$.

For each of the other users $102_n$, there is, for each of the messages $4_m$, a block $14_{nm}$, enabling rendering of the user-defined message content $4_m$ in a three-dimensional scene $20_n'$ viewed by the respective other user $102_n$. The user-defined message content $4_m$ moves, within the three-dimensional scene $20_n'$ viewed by the respective other users $102_n$, along a three-dimensional trajectory $8_{mn}$ dependent upon the first three-dimensional spatial information $5_m$, and three-dimensional spatial information of the respective other user $102_n$. In this way each of the other users $102_n$ views each user-defined message content $4_m$, within their own personal scene $20_n'$ and moving with their own personal trajectory $8_{mn}$.

Thus a message 2 may be sent from a single user to another user or other users (FIG. 1) and/or different messages 2 may be sent from users to another user or other users (FIG. 2).

Where different messages 2 are sent their message content 4 may be rendered simultaneously to at least some users. The message content 4 may be rendered as an object, for example as snippets of text (characters, symbols, icons, for example) moving in trajectory 8. The multiple objects 9 rendered may represent a barrage e.g. Danmu(弹幕) or "danmaku" but with each object potentially having a different non-parallel trajectory. The messages 2 may be rendered in real time or not in real-time, for example, with a timing based on timestamp information comprised within the metadata 6 of the messages 2.

Figure 3A:
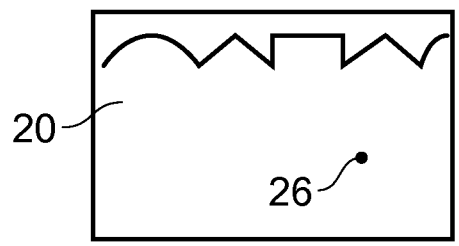
FIG. 3A illustrates an example of a first three-dimensional scene as viewed by a first user.

FIG. 3A illustrates an example of a first three-dimensional scene 20 as viewed by a first user 101. The first three-dimensional spatial information 5 defines a location 26 in the scene 20.

Figure 3B:
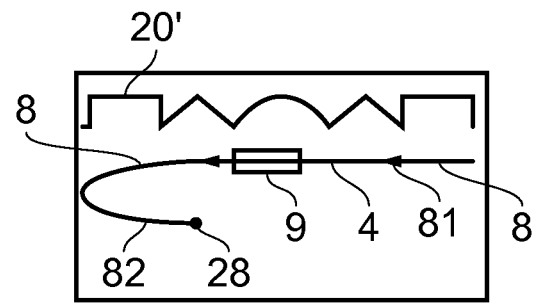
FIG. 3B illustrates an example of a second three-dimensional scene as viewed by a second user.

FIG. 3B illustrates an example of a second three-dimensional scene 20' viewed by the second user 102 in which the user-defined message content 4 is rendered. The user-defined message content 4 moves, within the second three-dimensional scene 20', along a three-dimensional trajectory 8. In this example, but not necessarily all examples, the user-defined message content 4 is rendered as a spatially limited moving object 9. The object 9 moves, within the second three-dimensional scene 20', along a three-dimensional trajectory 8.

The three-dimensional trajectory 8 is dependent upon at least first three-dimensional spatial information 5 defined in the metadata 5 of the message 2 and three-dimensional spatial information 55 of the second user 102.

The trajectory 8 is a non-rectilinear three-dimensional trajectory.

In this example but not necessarily all examples, the trajectory 8 has an initial portion 81 that is rectilinear and horizontal, right to left, and a subsequent portion 82 dependent upon the first three-dimensional spatial information 5.

A final portion 82 of the trajectory 8 is towards a destination location 28 defined by the first three-dimensional spatial information 5. In this example but not necessarily all examples, the trajectory 8 ends at a destination location 28, the user-defined message content 4 vanishing at the destination location 28.

The first three-dimensional spatial information 5 defines a location 26 in the scene 20 which in turn defines the destination location 28 in the second scene 20'.

The second scene 20' might or might not comprise at least a portion of the first scene 20. In some examples it may be the same scene.

The second scene 20' may be an image or video (recorded or live) or it may be the real world.

The message content 4 may be rendered as mediated reality (augmented reality or virtual reality) in a see video or see-through configuration. The second scene 20' may be the real-world seen through a transparent display for displaying the message content 4 or may be a video of the real-world or other content seen on a non-transparent display that also displays the message content 4.

Figure 4:
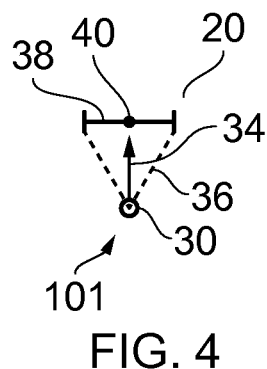
FIG. 4 illustrates an example of three-dimensional spatial information of the first user.

FIG. 4 illustrates a first user 101 located at a location 30 oriented so that the first user 101 has an orientation (perspective) 34 with a field of view 36. Although the orientation is illustrated in two-dimensions using only an azimuthal angle (360 degrees) it is, in this example, defined in three dimensions, in a polar coordinate system, by using an azimuthal angle (360 degrees) and a polar angle (180 degrees) [not illustrated]. The orientations define a spherical panorama and a segment of this panorama defined by the field of view 36 produces the first scene 20.

First three-dimensional spatial information 5 defines a location 26. The location 26 may be a location of a portion 38 of the scene 20 viewed by the first user 101, the location of an object of interest 40 within the scene 20 viewed by the first user 101 or a location 30 of the first user 101 viewing the scene 20.

In some but not necessarily all examples, the first three-dimensional spatial information 5 of the metadata 6 of the message 2 may be defined automatically, based on the location 26 at the time when the first user 101 defines the user-defined message content 4 of the message 2.

Figure 5A:
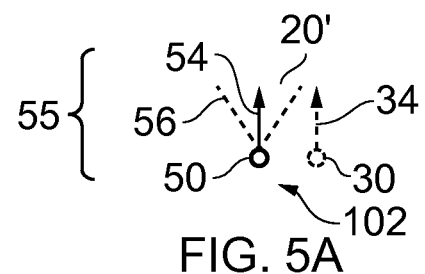
FIGS. 5A-5C illustrates different examples of three-dimensional spatial information of the second user.
Figure 5B:
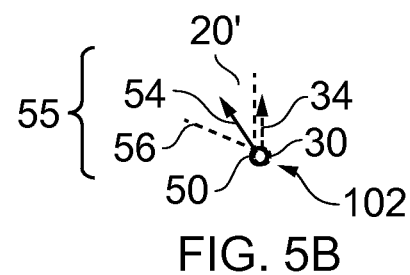
Figure 5C:
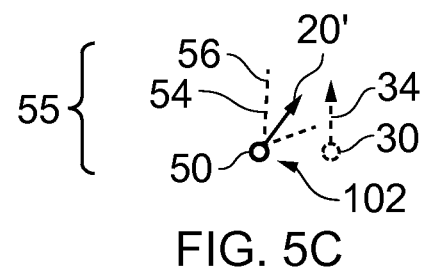

FIGS. 5A, 5B, 5C illustrate a second user 102 located at a location 50 oriented so that the second user 102 has an orientation (perspective) 54 with a field of view 56. The combination of location 50, orientation (perspective) 54 and field of view 56 defines the spatial information 55 of the second user 103, which determines the second scene 20' and the trajectory 8. Although the orientation is illustrated in two-dimensions using only an azimuthal angle (360 degrees) it is, in this example, defined in three dimensions, in a polar coordinate system, by using an azimuthal angle (360 degrees) and a polar angle (180 degrees) [not illustrated]. The orientations define a spherical panorama and a segment of this panorama defined by the field of view 36 produces the second scene 20'.

Each of FIGS. 5A, 5B, 5C have different combinations of location 50, orientation (perspective) 54 and field of view 56 which determine different second scenes 20' in each of the Figs.

It will therefore be appreciated that if the second user 102 changes one or more of location 50, orientation (perspective) 54 and field of view 56, then the second scene 20' changes.

The second scene 20' might or might not comprise a portion of the first scene 20 and vice versa. Whether or not this is the case depends on the location 50, orientation (perspective) 54 and the field of view 56 of the second user 102 relative to the location 30, orientation (perspective) 34 and field of view 36 of the first user 101.

Figure 6A:
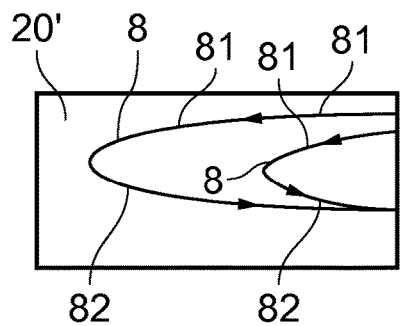
FIGS. 6A and 6B illustrate examples of different second scenes.
Figure 6B:
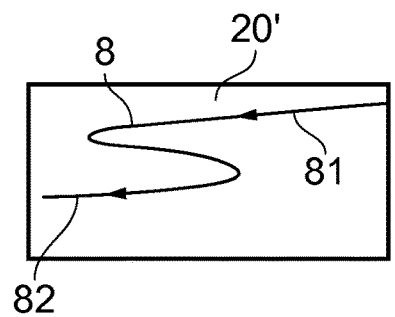

FIGS. 6A and 6B illustrate examples of different second scenes 20'.

The first three-dimensional spatial information 5 defines a location 26 in the scene 20 which in turn defines a destination location 28 for the trajectory 8 of the message content 4. In each of the examples of FIGS. 6A and 6B, the destination location 28 is outside the second scene 20'.

In FIG. 6A the destination location 28 is outside the second scene 20' to the right. Two messages 2 are delivered towards the same destination location 28. The message content 4 of each follows a different trajectory 8 towards the same destination location 28 off-screen. Each of the trajectories 8 has an initial portion 81 that is right to left, and a subsequent portion 82 left to right dependent upon the first three-dimensional spatial information 5 (destination location 28).

In FIG. 6B the destination location 28 is outside the second scene 20' to the left. A message 2 is delivered towards a destination location 28. The message content 4 follows a trajectory 8 towards the destination location 28 off-screen. The trajectory 8 has an initial portion 81 that is right to left, and a subsequent switchback portion 82 left to right then right to left dependent upon the first three-dimensional spatial information 5 (destination location 28).

In some embodiments, the size of the message content 4, as viewed by the first and second users 101, 102 at an instance in time depends upon the distance between the message content 4 at the three-dimensional location in the scene 20, 20' at which it is rendered and the location 30, 50 of the user 101, 102 viewing the message content 4. In such embodiments, the font size at which the message content 4 is viewed by the user 101, 102 may also depend upon that distance.

The initial trajectory 81 of the message content 4 need not be from right to left, as described above in relation to FIGS. 6A and 6B. The direction of the initial trajectory 81 may be user definable in some embodiments. The subsequent trajectory 82 may depend upon (for example, vary based on) the user-defined initial trajectory 81, such that the initial trajectory 81 and the subsequent/switchback trajectory 82 together form a continuous trajectory.

Figure 7:
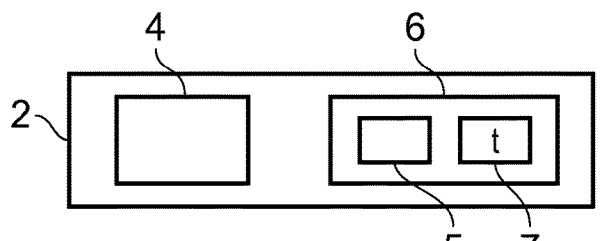
FIG. 7 illustrates an example of a message comprising message content and metadata.

The messages 2 may be rendered in real time or not in real-time, for example, with a timing based on timestamp information comprised within the metadata 6 of the messages 2. FIG. 7 illustrates an example of a message 2 comprising message content 4 and metadata 6. The metadata 6 comprises the first three-dimensional spatial information 5 and time information 7. Time information 7 defines the time at which the first user 101 defines the user-defined message content 4 of the message 2. The message content 4 may be rendered not in real-time, for example, with a timing based on time information 7. For example message content 4 may be queued for rendering based on an order defined by the time information 7.

In some embodiments, a message 2 may be resent by repeating the method, for example after the user-defined message content 4 has reached the destination location 28 and vanished. Resending may be performed automatically or in response to user input by the originating user 101.

Referring to FIGS. 5A-5C, FIG. 3B and FIGS. 6A and 6B it should be appreciated that the second scene 20' have been automatically adapted, dynamically in real-time, in dependence upon adaptation of the spatial information 55 of the second user 103. As the second scene 20' changes the trajectory 8 of the message content 4 is adapted, dynamically in real-time, in dependence upon the dynamic real-time adaptation of the three-dimensional spatial information 55 of the second user 102.

In some but not necessarily all examples, the moving user-defined message content 4 has visual persistence which creates a visual trace along the trajectory 8. The visual persistence of the moving user-defined message content 4 creates a temporary, fading trace within the second scene 20'.

The visual persistence may, in some examples, have a varying fade time so that the persistence is variable. For example, a visual persistence of the content 4 of a message 2 may become greater as the second scene 20' moves towards the destination location 28 for that message 2 and becomes less if the second scene 20' moves away from the destination location 28 of that message 2 or is stationary.

Figure 8A:
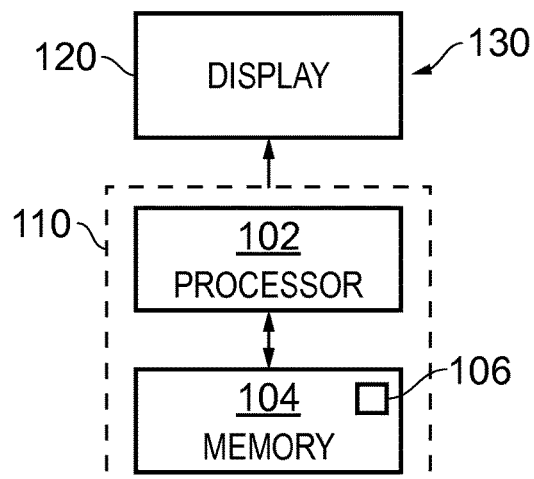
FIG. 8A illustrates an example of an apparatus configured to control a display to render the message content of one or more messages.

FIG. 8A illustrates an example of a controller configured to control a display 120 to render the message content 4 of one or more messages 2 as previously described.

Implementation of the controller 110 may be as controller circuitry. The controller 110 may be implemented in hardware alone, have certain aspects in software including firmware alone or can be a combination of hardware and software (including firmware).

As illustrated in FIG. 8A the controller 110 may be implemented using instructions that enable hardware functionality, for example, by using executable instructions of a computer program 106 in a general-purpose or special-purpose processor 102 that may be stored on a computer readable storage medium (disk, memory etc.) to be executed by such a processor 102.

The processor 102 is configured to read from and write to the memory 104. The processor 102 may also comprise an output interface via which data and/or commands are output by the processor 102 and an input interface via which data and/or commands are input to the processor 102.

The memory 104 stores a computer program 106 comprising computer program instructions (computer program code) that controls the operation of the apparatus 130 when loaded into the processor 102. The computer program instructions, of the computer program 106, provide the logic and routines that enables the apparatus to perform the methods illustrated in FIGS. 1 & 2. The processor 102 by reading the memory 104 is able to load and execute the computer program 106.

The apparatus 130 therefore comprises:
at least one processor 102; and
at least one memory 104 including computer program code
the at least one memory 104 and the computer program code configured to, with the at least one processor 102, cause the apparatus 130 at least to perform:
receiving a message defined by a first user for display to multiple other user in association with a first three-dimensional scene viewed by the first user and viewed by or viewable by the multiple other users, the message comprising user-defined message content for display and message metadata, not for display, defining first three-dimensional spatial information; and
enabling rendering of the user-defined message content as overlay on a second three-dimensional scene viewed by a second user, using the personal user apparatus, wherein the user-defined message content moves, within the second three-dimensional scene, along a three-dimensional trajectory dependent upon the first three-dimensional spatial information and three-dimensional spatial information of the second user.

The functions performed by the apparatus 130 may be performed in different ways, therefore the apparatus 130 may comprise: means for receiving a message defined by a first user for display to multiple other user in association with a first three-dimensional scene viewed by the first user and viewed by or viewable by the multiple other users, the message comprising user-defined message content for display and message metadata, not for display, defining first three-dimensional spatial information; and means for enabling rendering of the user-defined message content as overlay on a second three-dimensional scene viewed by a second user, using the personal user apparatus, wherein the user-defined message content moves, within the second three-dimensional scene, along a three-dimensional trajectory dependent upon the first three-dimensional spatial information and three-dimensional spatial information of the second user.

Figure 8B:
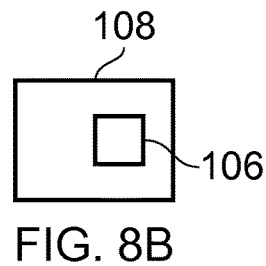
FIG. 8B illustrates an example of a delivery mechanism for a computer program.

As illustrated in FIG. 8B, the computer program 106 may arrive at the apparatus 130 via any suitable delivery mechanism 108. The delivery mechanism 108 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 106. The delivery mechanism may be a signal configured to reliably transfer the computer program 106. The apparatus 130 may propagate or transmit the computer program 106 as a computer data signal.

Although the memory 104 is illustrated as a single component/circuitry it may be implemented as one or more separate components/circuitry some or all of which may be integrated/removable and/or may provide permanent/semi-permanent/dynamic/cached storage.

Although the processor 102 is illustrated as a single component/circuitry it may be implemented as one or more separate components/circuitry some or all of which may be integrated/removable. The processor 102 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 8C:
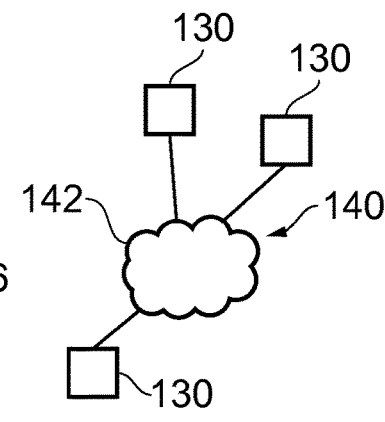
FIG. 8C illustrates an example of a system of multiple apparatus configured to control a display to render the message content of one or more messages.

FIG. 8C illustrates an example of a system 140 comprising a network 142, for example the internet and a plurality of apparatus 130. One or more the apparatus 130 may be used to compose one or more messages 2. One or more of the apparatus 130 may be used to render the composed messages 2 as described above.

Figure 9A:
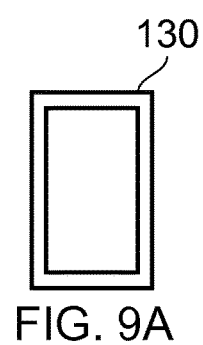
FIGS. 9A, 9B and 9C illustrate examples of the apparatus.
Figure 9B:
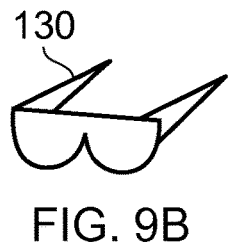
Figure 9C:
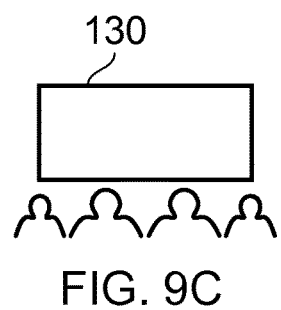

FIGS. 9A, 9B and 9C illustrate examples of the apparatus 130.

FIG. 9A illustrates an example of the apparatus 130 embodied in a user-personal apparatus such as, for example, a tablet computer, mobile phone etc. The apparatus 130 may be configured so that a user of the apparatus 130 can switch off rendering of the messages 2, in which case the message content 4 is not displayed FIG. 9B illustrates an example of the apparatus 130 embodied in a user-worn apparatus such as, for example, a head mounted display apparatus. The apparatus 130 may be configured so that a user of the apparatus 130 can switch off rendering of the messages 2, in which case the message content 4 is not displayed FIG. 9C illustrates an example of the apparatus 130 embodied in a shared apparatus viewed by many users 102, such as for example a cinema screening apparatus.

The blocks illustrated in the FIGS. 1 & 2 may represent steps in a method and/or sections of code in the computer program 106. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples.

Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   at least one processor; and
   at least one memory including computer program code,
   the at least one memory and the computer program code configured to, with the at least one processor, cause the apparatus to perform at least the following:
   enable a first user to define a message for display to at least a second user in association with a first three-dimensional scene viewed by the first user and viewed by or viewable by the second user, wherein the message comprises user-defined message content for display and message metadata, not for display, defining first three-dimensional spatial information; and
   enable rendering of the user-defined message content in a second three-dimensional scene viewed by the second user, wherein the user-defined message content moves, within the second three-dimensional scene, along a three-dimensional trajectory dependent upon the first three-dimensional spatial information and three-dimensional spatial information of the second user.

2. An apparatus as claimed in claim 1, further cause the apparatus to perform at least the following:
   automatic computer-implemented definition of the message metadata of the message in response to user-definition of the user-defined message content of the message.

3. An apparatus as claimed in claim 1, wherein the message metadata additionally comprises time information.

4. An apparatus as claimed in claim 1, further cause the apparatus to perform at least the following:
   generate automatically the first three-dimensional spatial information to define a location.

5. An apparatus as claimed in claim 4, wherein the location is a location of the scene viewed by the first user, a location of an object of interest within the scene viewed by the first user or a location of the first user viewing the scene.

6. An apparatus as claimed in claim 1, wherein user-defined message content is displayed as a spatially limited moving object.

7. An apparatus as claimed in claim 1, wherein the trajectory is a non-rectilinear three-dimensional trajectory.

8. An apparatus as claimed in claim 1, wherein the trajectory is initially rectilinear, right to left and is then dependent upon the first three-dimensional spatial information.

9. An apparatus as claimed in claim 1, wherein a final portion of the trajectory is towards a destination location defined by the first three-dimensional spatial information.

10. An apparatus as claimed in claim 9, wherein the trajectory ends at the destination location, the user-defined message content vanishing at the destination location.

11. An apparatus as claimed in claim 1, further cause the apparatus to perform at least the following:
    dynamic real-time adaptation of the trajectory in dependence upon dynamic real-time adaptation of the three-dimensional spatial information of the second user.

12. An apparatus as claimed in claim 1, wherein time-dependent visual persistence of the moving user-defined message content creates a temporary, fading three-dimensional trace along the three-dimensional trajectory within the second three-dimensional scene.

13. An apparatus as claimed in claim 1, wherein the message is defined for display to at least multiple other users, including the second user, in association with the first three-dimensional scene viewed by the first user and viewed by or viewable by the other users, the apparatus is further caused to perform at least the following:
    for each of the other users, enable rendering of the user-defined message content in a three-dimensional scene viewed by the respective other user, wherein the user-defined message content moves, within the three-dimensional scene viewed by the respective other user, along a three-dimensional trajectory dependent upon the first three-dimensional spatial information, and three-dimensional spatial information of the respective other user.

14. An apparatus as claimed in claim 1, further cause the apparatus to perform at least the following:
    enable originating users to define messages for display simultaneously to at least the second user in association with the three-dimensional scenes viewed by the originating users and viewed by or viewable by the second user, wherein each of the messages comprise user-defined message content for display and message metadata, not for display, defining first three-dimensional spatial information, and
    enable simultaneous rendering of the user-defined message content of the messages in a three-dimensional scene viewed by the second user, wherein the user-defined message content for each message moves, within the three-dimensional scene viewed by the second user, along a three-dimensional trajectory dependent upon the first three-dimensional spatial information of the message, and three-dimensional spatial information of the second user.

15. A method comprising:
    enabling a first user to define a message for display to at least a second user in association with a first three-dimensional scene viewed by the first user and viewed by or viewable by the second user, wherein the message comprises user-defined message content for display and message metadata, not for display, defining first three-dimensional spatial information; and enabling rendering of the user-defined message content in a second three-dimensional scene viewed by the second user, wherein the user-defined message content moves, within the second three-dimensional scene, along a three-dimensional trajectory dependent upon the first three-dimensional spatial information and three-dimensional spatial information of the second user.

16. A method as claimed in claim 15, comprising automatic computer-implemented definition of the message metadata of the message in response to user-definition of the user-defined message content of the message.

17. A method as claimed in claim 15, wherein the message metadata additionally comprises time information.

18. A method as claimed in claim 15, comprising automatically generating the first three-dimensional spatial information to define a location.

19. A method as claimed in claim 18, wherein the location is a location of the scene viewed by the first user, a location of an object of interest within the scene viewed by the first user or a location of the first user viewing the scene.

20. A non-transitory computer readable medium comprising program instructions stored thereon for performing at least the following:

enable a first user to define a message for display to at least a second user in association with a first three-dimensional scene viewed by the first user and viewed by or viewable by the second user, wherein the message comprises user-defined message content for display and message metadata, not for display, defining first three-dimensional spatial information; and enable rendering of the user-defined message content in a second three-dimensional scene viewed by the second user, wherein the user-defined message content moves, within the second three-dimensional scene, along a three-dimensional trajectory dependent upon the first three-dimensional spatial information and three-dimensional spatial information of the second user.

* * * * *